(12) United States Patent
Hiroishi

(10) Patent No.: US 8,002,530 B2
(45) Date of Patent: Aug. 23, 2011

(54) MOLD FOR VULCANIZATION OF TIRE

(75) Inventor: Masayuki Hiroishi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 189 days.

(21) Appl. No.: 12/301,181

(22) PCT Filed: May 28, 2007

(86) PCT No.: PCT/JP2007/060769
§ 371 (c)(1),
(2), (4) Date: Nov. 17, 2008

(87) PCT Pub. No.: WO2007/139047
PCT Pub. Date: Dec. 6, 2007

(65) Prior Publication Data
US 2009/0183811 A1    Jul. 23, 2009

(30) Foreign Application Priority Data

May 30, 2006  (JP) .................................. 2006-150091
Feb. 20, 2007  (JP) .................................. 2007-039659

(51) Int. Cl.
*B29C 33/10*    (2006.01)

(52) U.S. Cl. ...................................... 425/28.1; 425/812
(58) Field of Classification Search ................. 425/28.1, 425/812; 249/141
See application file for complete search history.

(56) References Cited

U.S. PATENT DOCUMENTS 6,789,591 B2 * 9/2004 Ikeda ............................ 425/812

FOREIGN PATENT DOCUMENTS

| JP | A 48-64473 | 8/1973 |
| JP | U 59-99730 | 7/1984 |
| JP | A 8-318716 | 12/1996 |
| JP | A 2001-213124 | 8/2001 |
| JP | A 2002-52537 | 2/2002 |
| JP | A 2004-136617 | 5/2004 |

* cited by examiner

*Primary Examiner* — James Mackey
(74) *Attorney, Agent, or Firm* — Greer, Burns & Crain, Ltd.

(57) ABSTRACT

Provided is a mold for vulcanization of a tire which does not entail troublesome work including removing vent spews, and which does not spoil the external appearance of the tire with the spews, and prevents light failures from occurring in the tire. Vent grooves are formed in sidewall molding surfaces for molding sidewall parts in such a way as to extend zigzag in the tire circumferential direction. At least one vent hole is formed in each of the vent grooves.

7 Claims, 11 Drawing Sheets

7A

7B

MOLD FOR VULCANIZATION OF TIRE

This application is a U.S. National Phase under 35 U.S.C. §371 of International Application No. PCT/JP2007/060769, filed May 28, 2007.

TECHNICAL FIELD

The present invention relates to a mold for vulcanization of a tire, and more specifically to a mold for vulcanization of a tire which is capable of preventing a light failure from occurring on a sidewall surface while a pneumatic tire is being vulcanized.

BACKGROUND ART

While a pneumatic tire is being vulcanized, if a trapped air is generated between a raw tire and a molding surface of a mold in a process of pressing the raw tire against the molding surface of the mold by swelling the raw tire from its inside by use of a bladder, the trapped air portion may cause a defective appearance that a concave is generated in the tire surface. The defective appearance is called light failure. Particularly a pneumatic tire whose sidewall surface is embossed with marks such as large-sized letters and patterns has a problem that, if a rigid member in the tire, such as an end portion of a bead filler or a folded-back end portion of a carcass layer, laps over an embossed mark in such a way to cut across the embossed mark, a light failure is more likely to occur in the embossed mark due to the difference in rigidity between the embossed mark and the rigid member.

As a conventional remedy for the light failure, a number of vent holes are provided in a molding surface of a vulcanization mold to discharge air to the outside of the mold, thereby preventing a trapped air from being generated. However, unvulcanized rubber flows into the vent holes after discharging air, and thus forms vent spews shaped like beards. Removal of the vent spews after vulcanization requires long man-hours. In addition, it is difficult to remove the vent spews, in the removal work, so as to have a level surface of the tire, because the vent spews are soft. Since parts of the vent spews thus remain as protrusions after the removal, there arises a problem that the remaining parts of the vent spews spoil the appearance of the tire.

With this taken into consideration, Patent Document 1 has proposed to reduce the number of vent holes provided in each sidewall molding surface in the following manner. Vent grooves are formed in the sidewall molding surface at predetermined intervals in the tire circumferential direction in such a way as to cut across the sidewall molding surface in a radial direction, and one vent hole is provided to each radial vent groove. However, because these vent grooves are each formed in the tire radial direction, it is impossible to fully prevent light failures if intervals at which the vent grooves are arranged in the tire circumferential direction are not set narrower. This restricts the reduction of vent holes in number.
Patent Document 1: Japanese patent application Kokai publication No. 2004-136617

DISCLOSURE OF THE INVENTION

Problem To Be Solved by the Invention

An object of the present invention is to provide a mold for vulcanization of a tire which has as a small number of vent holes as possible, which thus entails reduced troublesome work such as removing vent spews, which hence less spoils the external appearance of the tire, and which concurrently prevents light failures. Another object of the present invention is to provide a mold for vulcanization of a tire capable of preventing light failures from occurring particularly on a pneumatic tire whose sidewall surfaces are each embossed with marks.

Means for Solving the Problem

A mold for vulcanization of a tire according to the invention for attaining the foregoing objects is characterized by including: a vent groove formed in each sidewall molding surface for forming a sidewall part of the tire in such a way as to extend zigzag in a tire circumferential direction; and at least one vent hole provided to the vent groove.

It is desirable that an amplitude of the zigzag of the vent groove in a tire radial direction should be set between a rim check line in the sidewall molding surface and an end portion of a tread pattern, and that the amplitude is set at not less than 5 mm.

In a case where a mark is carved concavely in the sidewall molding surface, it is desirable that the vent groove should communicate with the mark in the tire radial direction for the purpose of preventing light failures from occurring on the marks.

In this case, it is desirable that, at least in a location where the vent groove communicates with the mark, the groove depth of the vent groove is set shallower than the groove depth of the mark. Furthermore, in a case where the mark is formed by a peripheral deep groove part and an inner shallow groove part, it is desirable that the vent groove is formed in such a way as to cut across the mark, and that the groove depth of the vent groove is set shallower than that of the deep groove part, but deeper than that of the shallow groove part.

Moreover, for the purpose of further preventing light failures from occurring, it is desirable that another vent groove which communicates with the mark in such a way as to cut across the marks in the tire circumferential direction should be formed.

Regardless of whether or not the marks may be carved in the sidewall molding surface, it is desirable that the number of turn portions of the zigzag vent groove in the tire radial direction should be set at not less than 12, but not more than 300.

In addition, it is desirable that the groove width of each of the zigzag vent groove and the other vent groove should be set in a range from 0.3 mm to 3 mm, and that the groove depth thereof should be set in a range from 0.3 mm to 1.5 mm.

Furthermore, regardless of whether the zigzag vent groove may be continuous or discontinuous in the tire circumferential direction, it is desirable that a total length of areas occupied by the zigzag vent groove in the tire circumferential direction should be set at not less than 50% of a total circumferential length of the tire.

EFFECTS OF THE INVENTION

The mold for vulcanization of a tire according to the present invention is capable of widely collecting the air which is confined between each sidewall molding surface and the tire not only from an area extending in the tire radial direction but also from an area extending in the tire circumferential direction. That is because the vent groove is formed in each sidewall molding surface in such a way as to extend zigzag in the tire circumferential direction. Accordingly, the forming of at least one vent hole in the zigzag vent groove makes it possible to reduce the number of vent holes to a minimum, and to reduce labor for removing spews from the tire after the vulcanization, as well as to prevent the post-vulcanized external appearance of the tire from being spoiling.

Furthermore, in a case where the marks such as letters and patterns are carved concavely in each sidewall molding surface, it is possible to prevent light failures from occurring on the marks by causing the vent groove to communicate with the marks in the tire radial direction.

Figure 6:
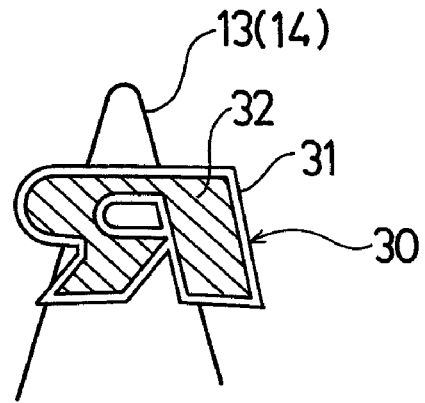
FIG. 6 is a partial magnified view showing an example of a mark carved in the sidewall molding surface shown in FIG. 4.
Figure 7:
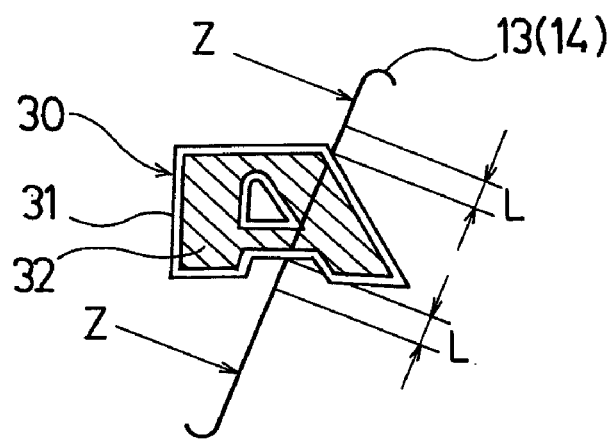
Figure 7:
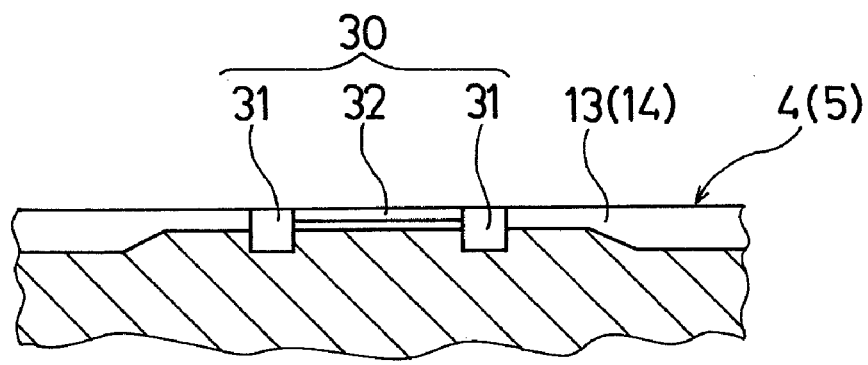

Part 7A of FIG. 7 is a partial magnified view showing another example of the mark, and corresponds to FIG. 6. Part 7B of FIG. 7 is an explanatory view schematically showing a cross-section of the mark taken along the Z-Z line of Part 7A of FIG. 7.

Figure 8:
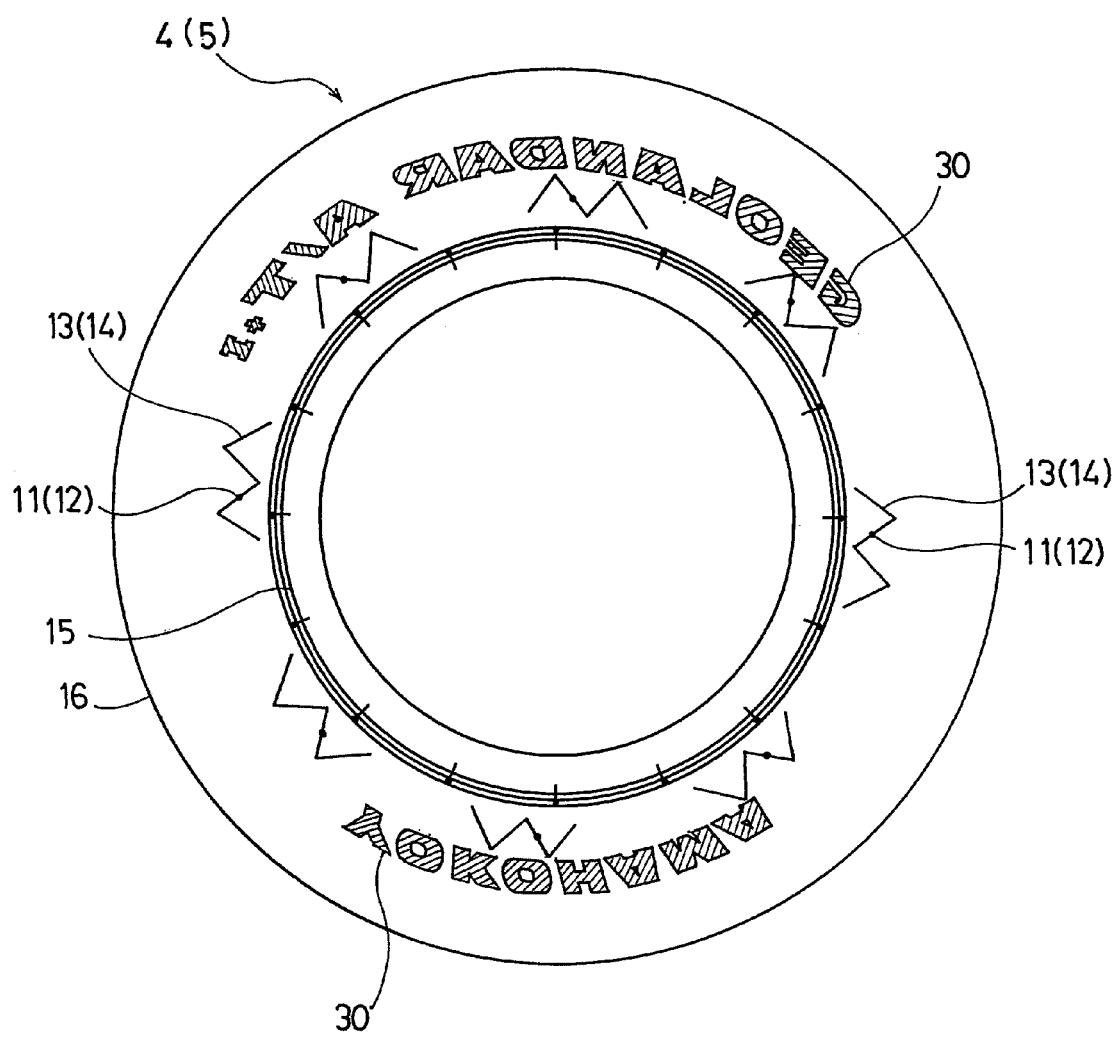

FIG. 8 is an inside view showing another embodiment of the sidewall molding surfaces constituting the mold for vulcanization of a tire according to the present invention.

Figure 9:
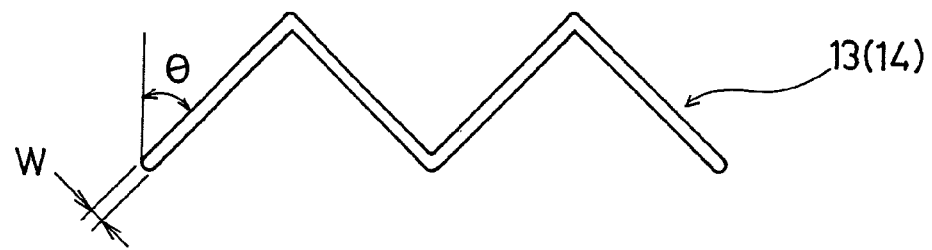

FIG. 9 is a partial magnified view of a vent groove carved in the mold according to the present invention.

Figure 10:
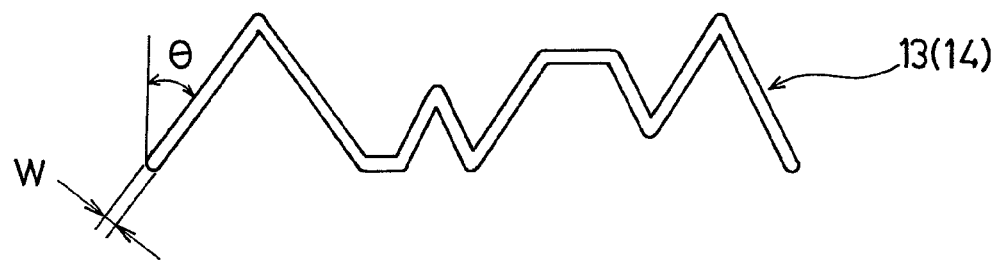

FIG. 10 is a partial magnified view of another embodiment of a vent groove carved in the mold according to the present invention.

Figure 11:
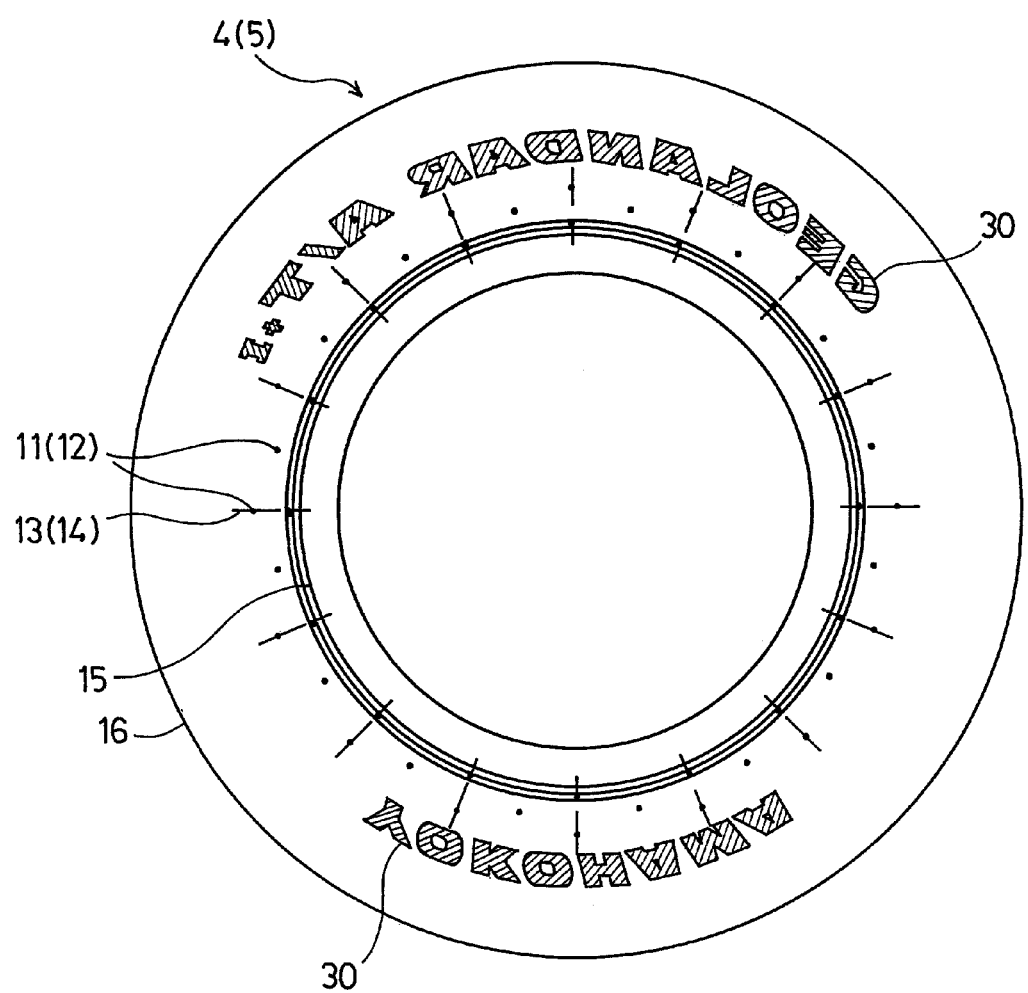

FIG. 11 is an inside view showing sidewall molding surfaces of a mold for vulcanization of a tire according to comparative example 1.

Figure 12:
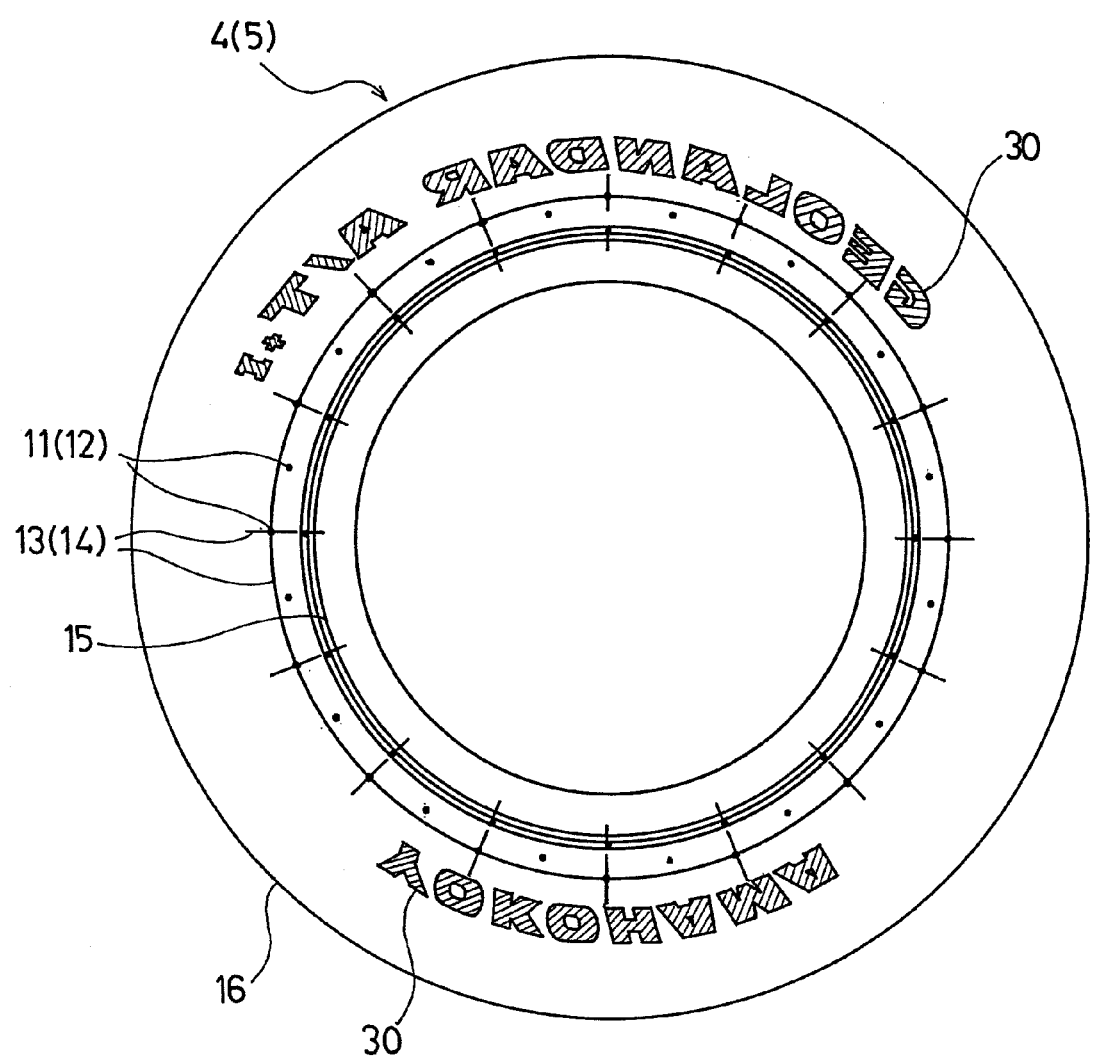

FIG. 12 is an inside view showing sidewall molding surfaces of a mold for vulcanization of a tire according to comparative example 2.

Figure 13:
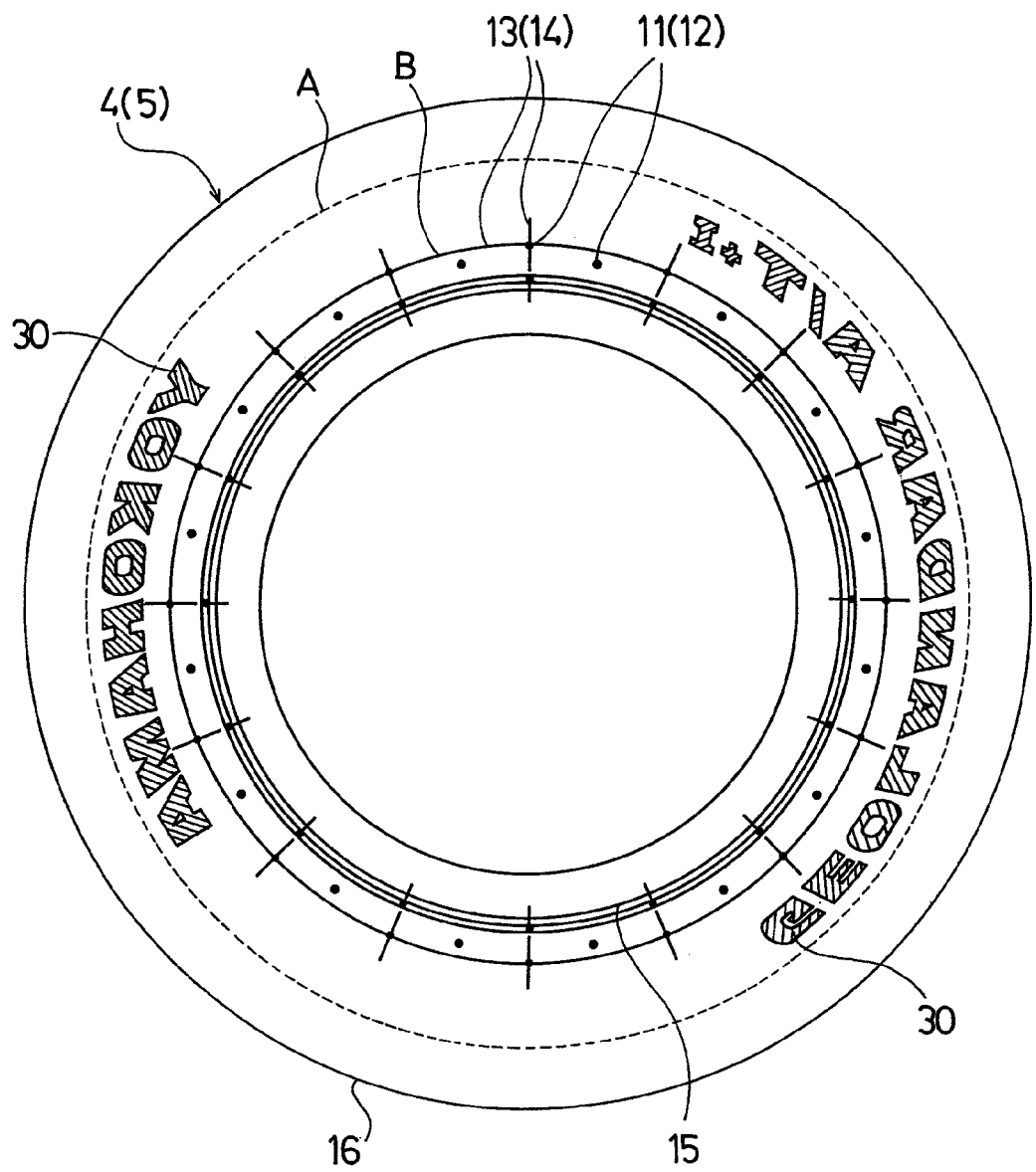

FIG. 13 is an inside view showing sidewall molding surfaces of a mold for vulcanization of a tire according to comparative example 3.

EXPLANATIONS OF LETTERS OR NUMERALS 1, 2 SIDE PLATE
4, 5 SIDEWALL MOLDING SURFACE
11, 12 VENT HOLE
13, 14 VENT GROOVE
15 RIM CHECK LINE
16 TREAD PATTERN END PORTION
17 VENT GROOVE
30 MARK (CONCAVE PART)
31 DEEP GROOVE PART
32 SHALLOW GROOVE PART

BEST MODES FOR CARRYING OUT THE INVENTION

Figure 1:
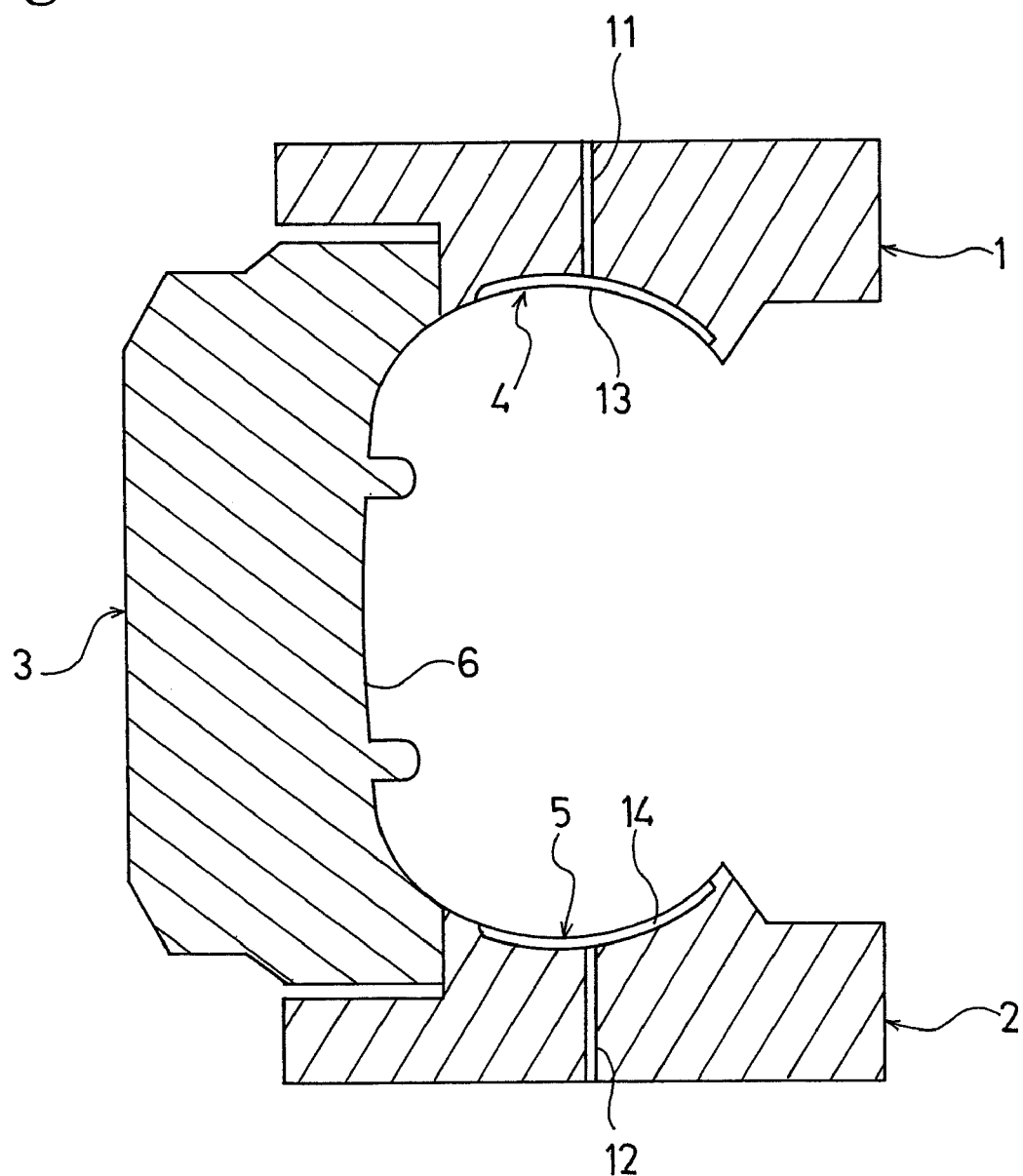
FIG. 1 is a cross-sectional view schematically showing an example of an embodiment of a mold for vulcanization of a tire according to the present invention.
Figure 2:
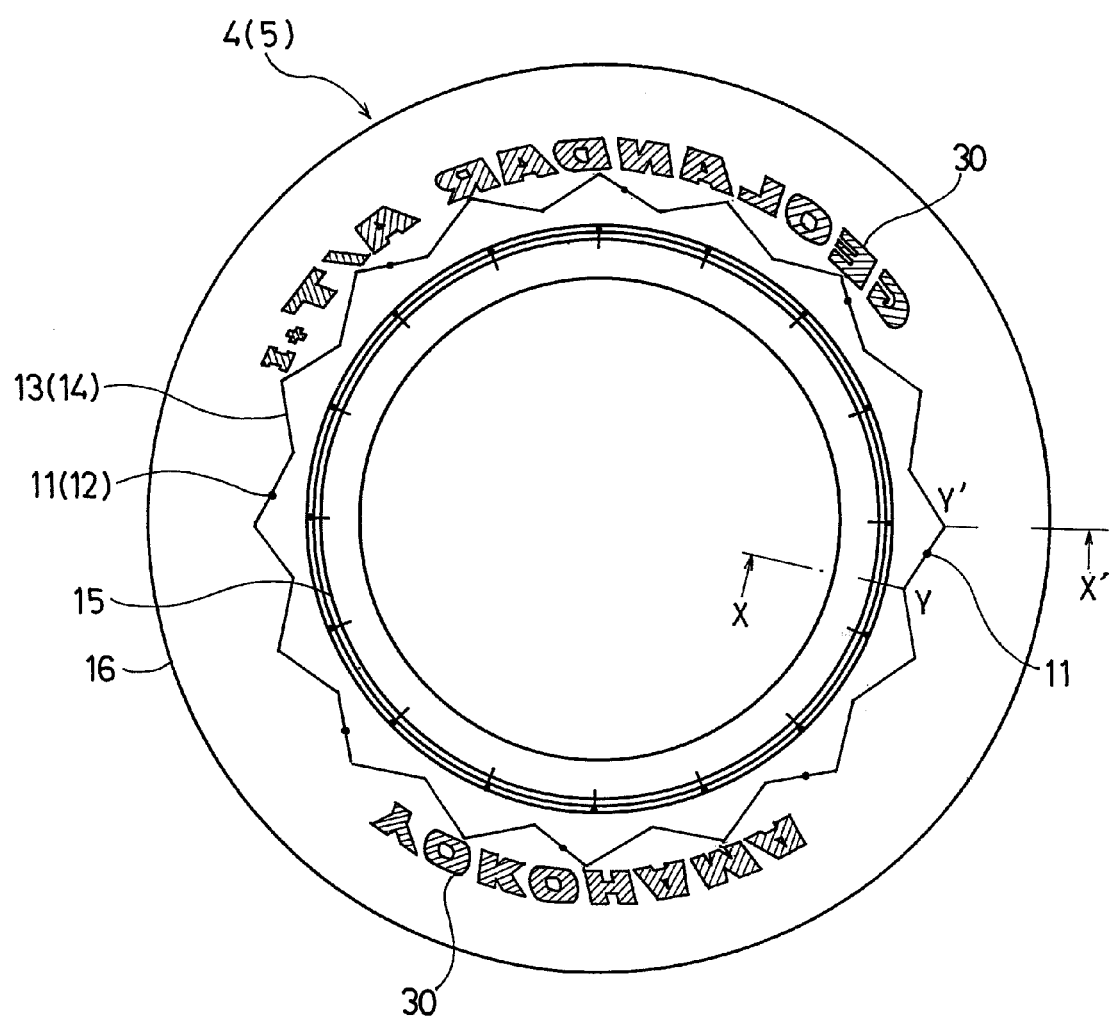
FIG. 2 is an inside view of sidewall molding surfaces constituting the mold shown in FIG. 1.

FIGS. 1 and 2 each show an embodiment of a mold for vulcanization of a tire according to the present invention which is applied to a mold of a sectional type. FIG. 1 is a cross-sectional view of the mold and FIG. 2 is an inside view of a side plate constituting the mold. In addition, the side plates shown in FIG. 1 show a cross-sectional view of the side plate taken along the X-Y-Y'-X' line of FIG. 2.

Figure 3:
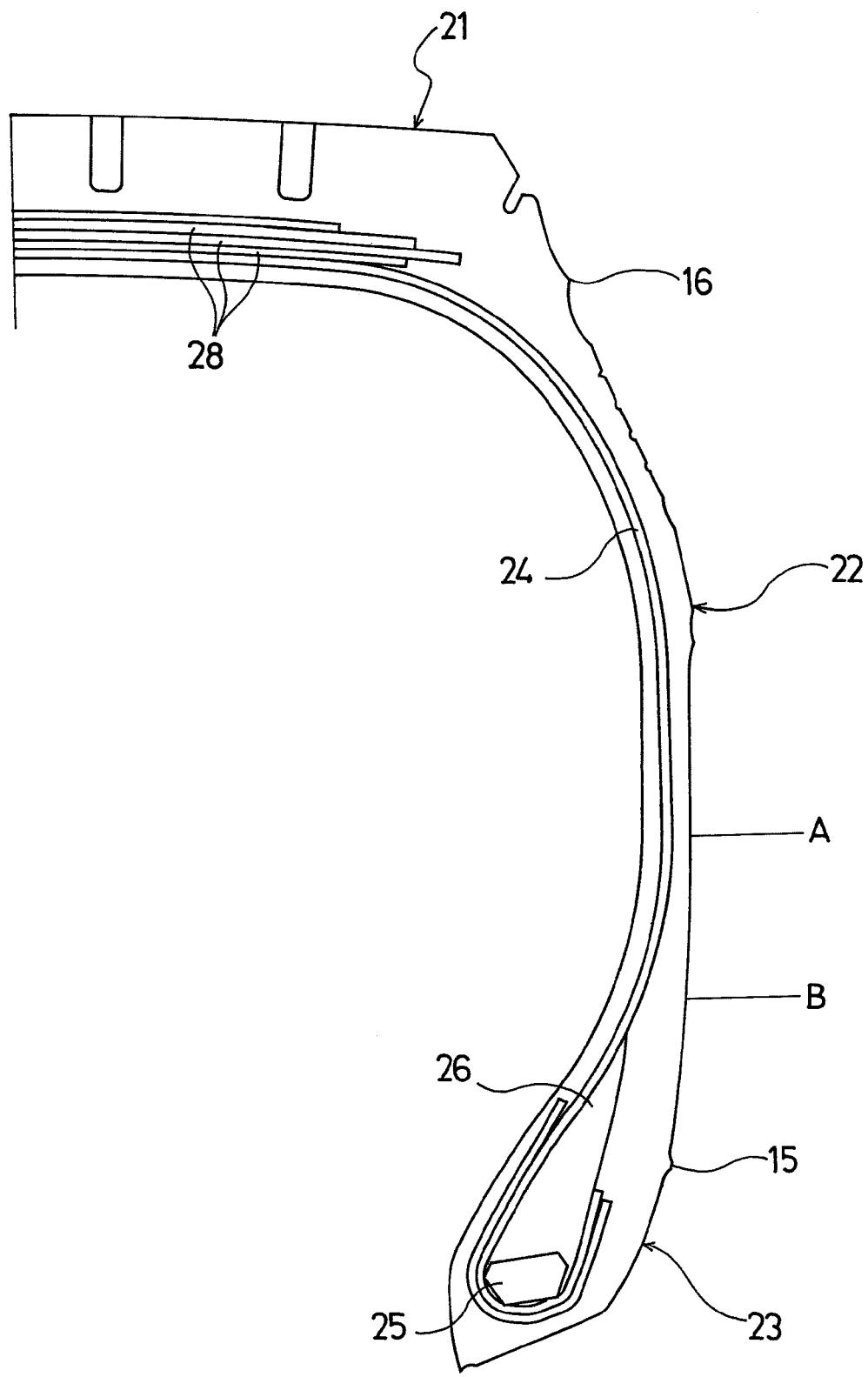
FIG. 3 is a half cross-sectional view showing an example of a pneumatic tire formed by use of the mold for vulcanization of a tire shown in FIGS. 1 and 2, which is taken in a meridional direction.

Furthermore, FIG. 3 shows an example of a pneumatic tire formed by use of the mold for vulcanization of a tire. The pneumatic tire includes a tread part 21, a sidewall part 22 and a bead part 23. A carcass layer 24 is laid between paired left and right bead parts 23, 23. The carcass layer 24 is folded back from the tire inside to the tire outside in such a way as to wrap a bead core 25 and a bead filler 26 which are embedded in the bead part 23. A multi-layered belt layer 28 is embedded in the outer periphery of the carcass layer 24 in the tread part 21 in such a way as to extend throughout the tire in its circumferential direction. In the sidewall part 22, an area extending from point A to B is a portion in which marks including large-sized letters, patterns, figures and the like are arranged to form a convex shape. In the example shown in FIG. 3, the end portion of the rigid bead filler 26 is designed to overlap no marks.

As shown in FIGS. 1 and 2, the mold for vulcanization of a tire is configured: by arranging annular side plates 1, 2 for forming the sidewall parts of the tire in the upper and lower portions of the mold for vulcanization of a tire, respectively; and by arranging multiple sectors 3 for jointly forming the tread part 21 in the outer periphery of the side plates 1, 2. Each sector 3 includes a tread forming surface 6 on its inner surface. The side plates 1, 2 respectively include sidewall molding surfaces 4, 5 each for forming a sidewall part 22 and the bead part 23.

Concave marks 30 are carved in the sidewall molding surfaces 4, 5 in the tire circumferential direction for the purpose of forming letters, patterns and the like representing a brand of the tire in such a way as to stand up on the surface of the tire. In addition, vent grooves 13, 14 each extending zigzag are respectively formed in the sidewall molding surfaces 4, 5 in such a way as to continue in a circle. The vent grooves 13, 14 are each provided with vent holes 11, 12 spaced in the tire circumferential direction. In the example of the mold for vulcanization of a tire illustrated, the number of vent holes 11 is 8 whereas the number of vent holes 12 is 8. The vent holes 11, 12 penetrate the corresponding side plate 1, 2 and their end portions communicate with the outside of the mold. Note that, in FIG. 1, the vent holes 11, 12 and the vent grooves 13, 14 are enlarged to be schematically illustrated in an emphasized manner for ease of understanding.

A pneumatic tire is vulcanized as follows. A green tire is inserted in the mold for vulcanization of a tire, and a bladder is swollen from the inner surface of the raw tire. Thereby, the raw tire is pressed against the tread molding surface 6 and the sidewall molding surfaces 4, 5. The pressing of the raw tire against the sidewall molding surfaces 4, 5 collects air confined between the raw tire and the sidewall molding surfaces 4, 5 into the vent grooves 13, 14 each extending zigzag in the tire circumferential direction including the tire radial direction. The collected air moves toward the corresponding vent holes 11, 12 along the vent grooves 13, 14, respectively. Finally, the air is discharged to the outside of the mold from the vent holes 11, 12.

In this manner, the air moves to the vent holes after collected into the vent grooves each extending zigzag in the tire circumferential direction. This makes it possible to reduce the number of vent holes provided in each sidewall molding surface in its circumferential direction to a minimum. This reduction of the vent holes decreases labor needed to remove vent spews after the vulcanization, and thus prevents the appearance of the tire after the vulcanization from being spoiled. Moreover, the reduction makes it possible to decrease the amount of produced rubber waste of thus removed vent spews.

Figure 4:
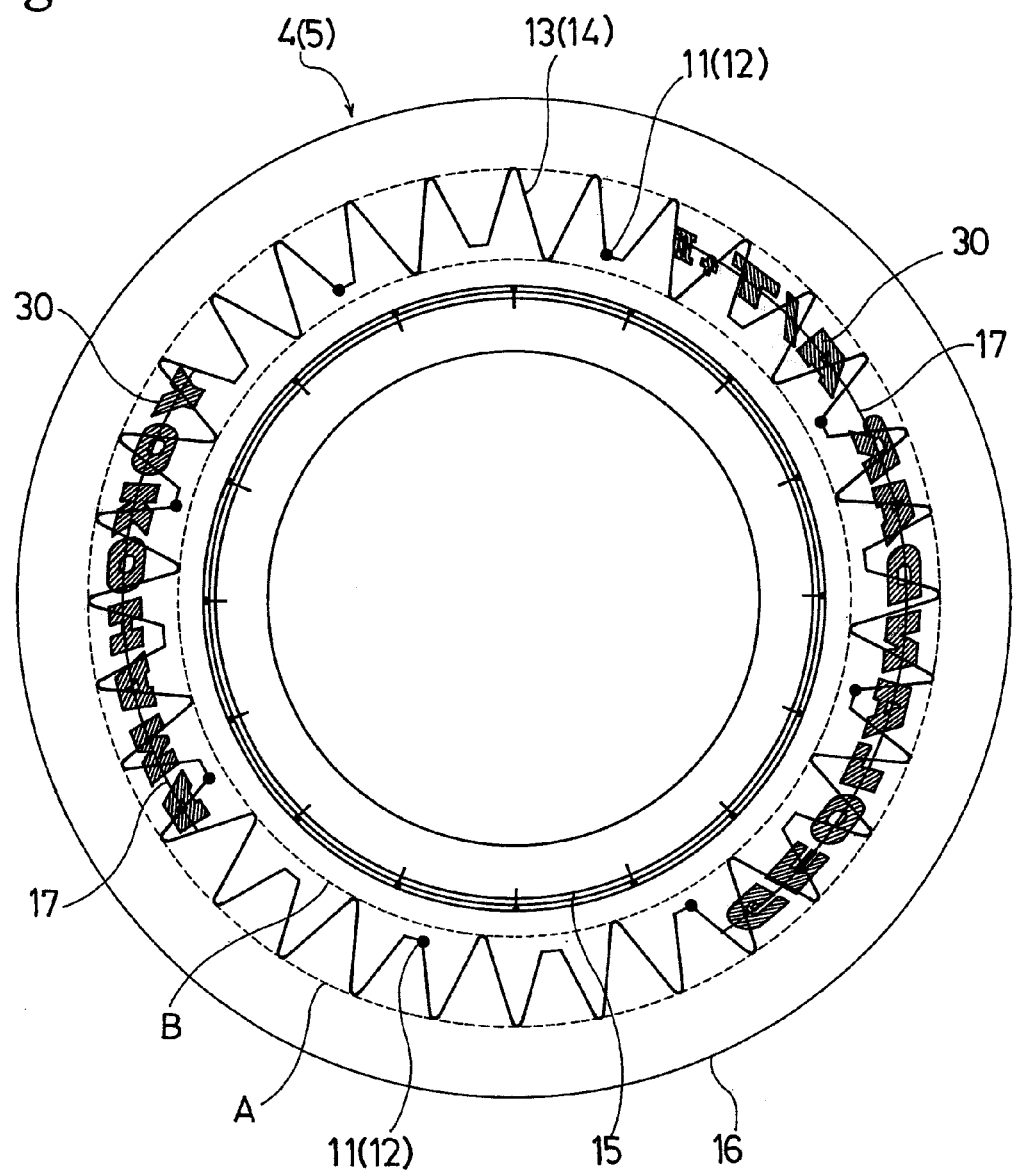
FIG. 4 is an inside view of sidewall molding surfaces of another embodiment of the mold according to the present invention.
Figure 5:
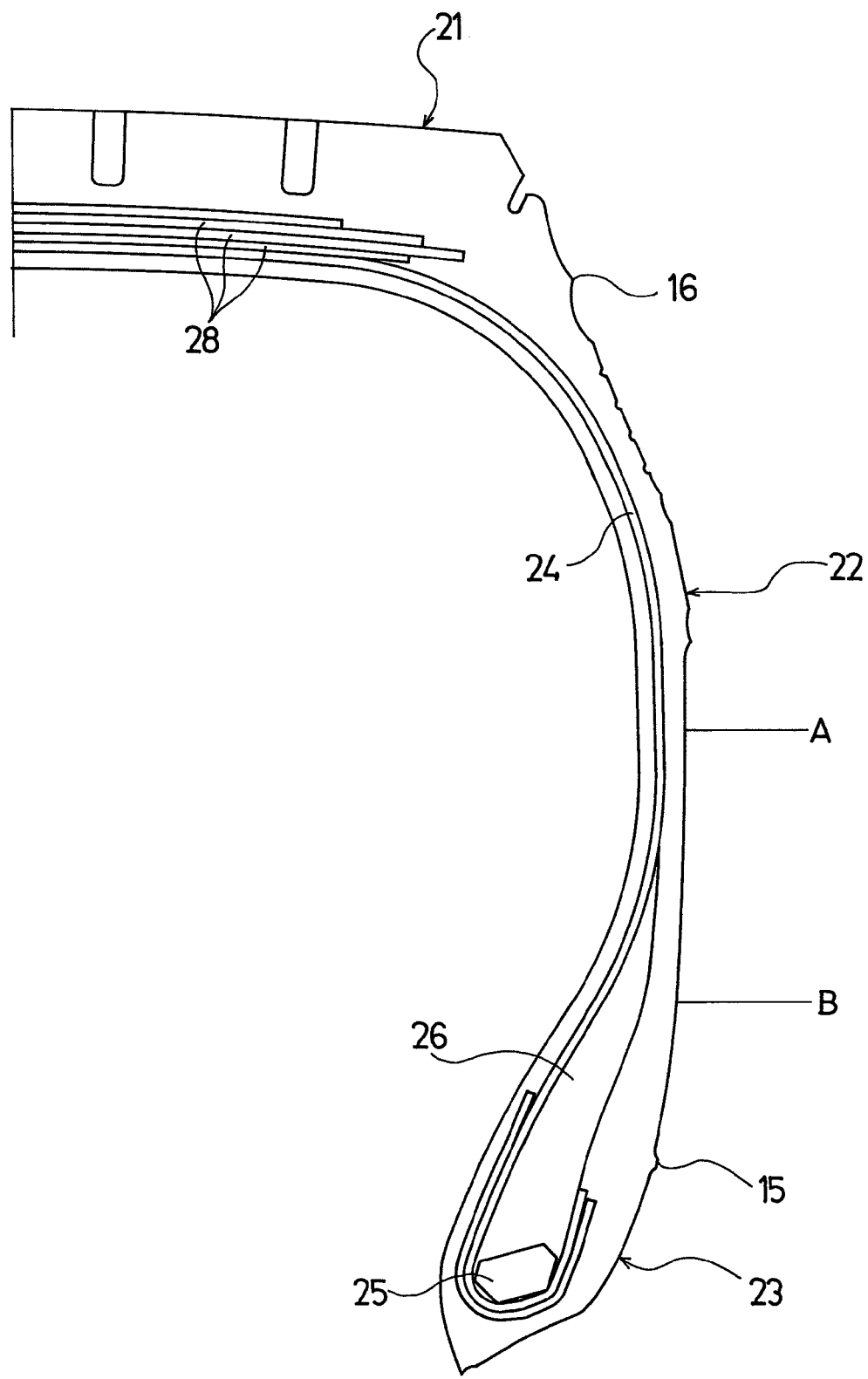
FIG. 5 is a half cross-sectional view showing an example of a pneumatic tire formed by use of the mold for vulcanization of a tire shown in FIG. 4.

FIG. 4 shows another embodiment of the side plates constituting the mold for vulcanization of a tire according to the present invention. FIG. 5 shows an example of a pneumatic tire formed by use of this mold for vulcanization of a tire.

The pneumatic tire is different from the tire exemplified in FIG. 3 only in that the length of each of the bead fillers 26 in its radial direction is longer. The end portion of each bead filler 26 overlaps an area (AB) in the corresponding sidewall surface in such a way as to cut across the area (AB). The area (AB) is provided with the marks such as letters, patterns and figures. As described, in the case where the end portion of each bead filler 26 extends into the area (AB) in the corresponding sidewall surface, the rigidity difference between the bead filler 26 and the area (AB) may generally cause a light failure. In addition, trapped air is more likely to be formed in the sidewall surface because concave parts for forming the mark are carved in the sidewall molding surface. Accordingly, a light failure is more likely to occur. This phenomenon similarly occurs in a case where the folded-back terminal portions of the carcass layer 24 overlap the respective areas (AB).

For the purpose of forming the foregoing pneumatic tire, in the mold for vulcanization of a tire including the side plates shown in FIG. 4, the zigzag vent groove 13(14) is formed in such a way as to communicate with the marks 30 in the tire radial direction, the marks 30 being concavely carved in the area (AB) in the sidewall molding surface 4(5). In addition, it is desirable that the vent groove 13(14) should cut across the marks 30 in the tire radial direction in such a way as to continuously extend zigzag from inner side to outer side and then vice versa in the tire radial direction. Moreover, it is desirable that, in addition to the zigzag vent groove 13(14), other vent grooves 17 communicating with multiple adjacent marks 30 should be formed in such a way as to cut across the adjacent marks 30 in the tire circumference direction.

This communication of the zigzag vent groove 13(14) with each concave mark 30 makes it possible to efficiently discharge the air which is likely to accumulate in the concave mark 30, and accordingly to suppress occurrence of a light failure. In addition, the communication of each of the other vent grooves 17 with the multiple marks in such a way as to cut across the multiple marks in the tire circumferential direction makes it possible to efficiently discharge the air which locally exists in some marks from one to another. Because light failures are efficiently checked by causing the vent grooves to communicate with the marks in this manner, it is possible to enhance the decorativeness of the marks while reducing the number of vent holes to a minimum.

It is desirable that the zigzag vent groove 13(14) should communicate with all of the multiple marks arranged in the tire circumferential direction. However, the zigzag groove 13(14) may communicate with some of the multiple marks. In addition, it is desirable that, in at least a part of the vent groove 13(14) communicating with each mark 30, the groove depth of the vent groove 13(14) should be shallower than the groove depth of each mark. This makes it possible to enhance the mark identifiability after its formation and thus makes it possible to prevent the protruding strip formed by the vent groove from inhibiting the visibility of each mark. For example, in a case where, as shown in FIG. 6, a concave part of the mark 30 is formed of a peripheral deep groove part 31 and an inner shallow groove part 32, it is desirable that the vent groove 13(14) should communicate with the mark 30 in a way that the vent groove 13(14) is shallower than the deep groove part 31 of the mark 30.

Furthermore, in a case where, as shown in Parts 7A and 7B of FIG. 7, the mark 30 is formed of a peripheral deep groove part 31 and an inner shallow groove part 32, it suffices that the groove depth of the vent groove 13(14) is shallower than the groove depth of the mark 30 at least in its part communicating with the mark 30. For this reason, the vent groove 13(14) may be deeper than the shallow groove part 32 of the mark 30 while being shallower than the deep groove part 31. In both cases shown in FIGS. 6 and 7, it suffices that an area (L) where the groove depth of the vent groove 13(14) is controlled relative to the groove depth of the peripheral portion of the mark 30 in this manner is 2 mm or more in width from the peripheral edge of the mark 30. This control of the groove depth of the vent groove makes it possible to enhance the visibility of the brand display and the like formed by use of a series of carved marks 30.

In the case of the present invention, it is desirable that the zigzag vent groove should continue endlessly in the tire circumferential direction. However, like in an embodiment shown in FIG. 8, the zigzag vent groove may break its continuity at intervals. In the example shown in FIG. 8, the zigzag vent groove 13(14) is discontinued intermittently in the tire circumferential direction, and are thus separated into 8 areas. A vent hole 11(12) is provided in each of the 8 areas.

In such separation, it is desirable that the total length of the separated areas of the vent groove 13(14) in the tire circumferential direction should account for 50% or more of the entire circumferential length. When the total length of the separated areas of the zigzag vent groove 13(14) occupies the whole length of the vent groove 13(14) which would continue in the tire circumferential direction in the foregoing range, it is possible to efficiently discharge the air which is confined in the sidewall molding surfaces.

The zigzag amplitude of the vent groove 13(14) in the tire radial direction should preferably be at least 5 mm, and more preferably be 15 mm or more. In addition, the lower limit in the tire radial direction should be a rim check line 15 of the sidewall molding surface 4(5), and the upper limit in the tire radial direction should be a tread pattern end portion 16 (corresponding to the uppermost edge of each side plate). Moreover, no specific restriction is imposed on the number of turns of the zigzag. However, it is desirable that the number of turns of the zigzag should be not less than 12, but not more than 300. The setting of the number of turns in this range makes it possible to enhance the vent effect.

Furthermore, as shown in FIG. 9, the turns of the zigzag vent groove 13(14) may be repeated at a constant pitch and with a constant amplitude in the tire circumferential direction, or may be repeated, as shown in FIG. 10, at various pitches and with various amplitudes and gradients in the tire circumferential direction. Moreover, the zigzag is not limited to a line which has an alternate series of straight lines and sharp turns, and may be a line which has a series of curves.

An angle θ of the vent groove 13(14) to the tire radial direction should preferably be 5° or more but less than 90°, and more preferably 25° to 70°. Note that, in a case where the vent groove is formed as a series of curves, each gradient angle θ is defined as an angle formed between a straight line joining the corresponding two neighboring peaks of the zigzag and the tire radial direction. The setting of the gradient angle θ of the vent groove within such a range and the concurrent setting of the amplitude within the foregoing range makes it possible to more widely collect the air which is confined in the sidewall molding surfaces.

Regardless of whether or not the zigzag vent groove 13(14) and the other vent groove 17 communicate with the marks, no specific restriction is imposed on the groove width (w) of the zigzag vent groove 13(14) and the other vent groove 17. The groove width (w) should preferably be 0.3 mm to 3 mm, and more preferably be 0.3 mm to 1.5 mm. In addition, the groove depth of each of these vent grooves should preferably be 0.3 mm to mm, and more preferably be 0.3 mm to 1.0 mm. The setting of the groove width and groove depth of each of these vent grooves within such ranges makes it possible to obtain an effect of sufficiently discharging the air. Moreover, the setting makes it possible to prevent an unsuitable air discharge which would otherwise occur when the groove width and groove depth of each vent groove are too large.

The application of the present invention is not limited to the sectional mold which has been illustrated by the drawing. The present invention can be effectively applied to a two-piece mold.

From now on, descriptions will be provided for the present invention by citing examples. However, the descriptions impose no restriction on the scope of the present invention.

EXAMPLES

Examples 1 and 2

As a mold for vulcanization of a pneumatic tire with a 265/70R16 tire size and with the structure shown in FIG. 3, four types of vulcanization molds were produced by locating vent grooves differently among Examples 1 and 2 as well as Comparative Examples 1 and 2 as follows. In each vulcanization mold, an area where the vent grooves were located extended between the rim check line and a position 65 mm toward the bead from a position corresponding to the tire maximum width in the sidewall molding surface of each of the side plates.

Example 1

As shown in FIG. 8, 8 zigzag vent grooves each having three turn portions, one vent hole and a 40-mm amplitude in the tire radial direction were located intermittently in the tire circumferential direction. The total length of areas occupied by these vent grooves in the tire circumferential direction is set to 50% of the total circumferential length.

Example 2

As shown in FIG. 2, a zigzag vent groove with a 40-mm amplitude and 32 turn portions was continuously formed in the tire circumferential direction. 8 vent holes were arranged in the vent groove at equal intervals in the tire circumferential direction.

Comparative Example 1

As shown in FIG. 11, 16 straight vent grooves which were 40 mm long in the tire radial direction were formed at equal intervals in the tire circumferential direction. One vent hole was provided to each vent groove. In addition, an independent vent hole was provided between each two neighboring vent grooves.

Comparative Example 2

As shown in FIG. 12, an annular vent groove continuous in the tire circumferential direction was added to the mold according to Comparative Example 1.

For the experiment purpose, green tires on which light side failures were likely to occur were formed by use of a rigid rubber material in each sidewall part. These green tires were vulcanized by use of the foregoing four types of vulcanization molds to obtain 20 pneumatic tires for each vulcanization mold. The pneumatic tires thus obtained were visually evaluated, and the results shown in Table 1 were obtained.

TABLE 1

|  | Example 1 | Example 2 | Comparative Example 1 | Comparative Example 2 |
| --- | --- | --- | --- | --- |
| Shape of Vent Groove(s) | FIG. 8 | FIG. 2 | FIG. 11 | FIG. 12 |
| Number of Tires on which Light Failures Occurred | 1 | Zero | 4 | 2 |
| Number of Light Failures per Tire | 1 | Zero | 5 | 3 |

As clear from Table 1, it is learned that the number of tires on which a light failure occurred in Examples 1 and 2 was smaller than that in Comparative Examples 1 and 2, although the number of vent holes formed in each of the molds according to Examples 1 and 2 was only a half of the number of vent holes formed in each of the molds according to Comparative Examples 1 and 2. In addition, with regard to Example 1, only one light failure occurred on only one tire, and the light failure was a minor trouble. By contrast, in Comparative Example 1, light failures occurred on four tires, and five or more light failures occurred on each of the four tires. Furthermore, the light failures were serious. In Comparative Example 2, light failures occurred on two tires, and three or more light failures occurred on each of the two tires.

Example 3

As a mold for vulcanization of a pneumatic tire with a 265/70R16 tire size and with the structure shown in FIG. 5, two types of vulcanization molds were produced by locating, in the area (AB) in a sidewall molding surface of each of the side plates located on both sides, marks "YOKOHAMA" and "GEOLANDER A/R+II" as well as vent grooves differently as in Example 3 and Comparative Example 3 described below, for the purpose of vulcanizing pneumatic tires each having the marks.

Example 3

In the area (AB), as shown in FIG. 4, a zigzag vent groove having 64 turn portions was formed with a 65-mm amplitude in such a way as to be continuous in the tire circumferential direction while connected to the concave marks. In addition, 8 vent holes were arranged at almost equal intervals in the tire circumferential direction. Moreover, other arc-shaped vent grooves were formed in the tire circumferential direction in such a way as to cut across all of the marks formed in each sidewall molding surface.

Comparative Example 3

In the area (AB), as shown in FIG. 13, 16 straight vent grooves which were 40 mm long in the tire radial direction were formed at equal intervals in the tire circumferential direction. The 16 straight vent grooves were located inward of the marks in the tire radial direction and the marks were arranged in the tire circumferential direction. In addition, one vent hole was provided to each vent groove, and one independent vent hole was provided between each two neighboring vent grooves. Moreover, an annular vent groove continuous in the tire circumferential direction was added outward of the vent holes in the tire radial direction without causing the annular vent groove to communicate with the marks.

By use of each of the two types of vulcanization molds described above, vulcanization was performed to produce 20 pneumatic tires for each vulcanization mold. The pneumatic tires thus obtained were evaluated visually in terms of occurrence statuses of light failures and evaluation results shown in Table 2 were obtained.

TABLE 2

|  | Example 3 | Comparative Example 3 |
|---|---|---|
| Shape of Vent Groove(s) | FIG. 4 | FIG. 13 |
| Number of Tire on which Light Failures Occurred | Zero | 3 |
| Number of Light Failures per Tire | Zero | 4 |

As clear from Table 2, no light failures occurred in the case of the mold according to Example 3, although the marks lapped over the end portion of each of the bead fillers. Light failures occurred on three tires out of those formed by using the mold of Comparative Example 3, and four or more light failures occurred on each tire in the location and a vicinity of the marks. The degrees of the troubles were more serious than on the pneumatic tire produced according to Comparative Example 1 described above.

What is claimed is:

1. A mold for vulcanization of a tire comprising:
  a vent groove formed in each sidewall molding surface for forming a sidewall part of the tire in such a way as to extend zigzag in a tire circumferential direction;
  at least one vent hole provided to the vent groove; and
  a mark which is carved concavely in the sidewall molding surface, being arranged in the tire circumferential direction, and being formed by a peripheral deep groove part and an inner shallow groove part, wherein
  the vent groove is formed in such a way as to cut across the mark and communicates with the mark in the tire radial direction, and
  the groove depth of the vent groove is set shallower than that of the deep groove part, but deeper than that of the shallow groove part.

2. The mold for vulcanization of a tire according to claim 1, further comprising
  another vent groove which is formed to communicate with the mark in such a way as to cut across the mark in the tire circumferential direction.

3. The mold for vulcanization of a tire according to claim 1, wherein
  the number of turn portions of the zigzag vent groove in the tire radial direction is set at not less than 12, but not more than 300.

4. The mold for vulcanization of a tire according to claim 2, wherein
  the groove width of each of the zigzag vent groove and the other vent groove is set in a range from 0.3 mm to 3 mm.

5. The mold for vulcanization of a tire according to claim 2, wherein
  the groove depth of each of the zigzag vent groove and the other vent groove is set in a range from 0.3 mm to 1.5 mm.

6. The mold for vulcanization of a tire according to claim 1, wherein
  a total length of areas occupied by the zigzag vent groove in the tire circumferential direction is set at not less than 50% of a total circumferential length of the tire.

7. The mold for vulcanization of a tire according to claim 1, wherein
  an amplitude of the zigzag of the vent groove in a tire radial direction is set between a rim check line in the sidewall molding surface and an end portion of a tread pattern, and
  the amplitude is set at at least 5 mm or more.

* * * * *